(12) United States Patent
Pflug et al.

(10) Patent No.: US 7,631,624 B2
(45) Date of Patent: Dec. 15, 2009

(54) TRACTION MECHANISM DRIVE

(75) Inventors: Rainer Pflug, Heilsbronn (DE); Tino Haensel, Emskirchen (DE); Peter Kelm, Herzogenaurach (DE); Rainer Baumueller, Herzogenaurach (DE); Thomas Bertelshofer, Ebermannstadt (DE); Martin Assel, Burgbernheim (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/482,566

(22) Filed: Jul. 7, 2006

(65) Prior Publication Data

US 2007/0017464 A1    Jan. 25, 2007

Related U.S. Application Data

(60) Provisional application No. 60/697,927, filed on Jul. 8, 2005.

(51) Int. Cl.
*F01L 1/02* (2006.01)

(52) U.S. Cl. ............... 123/90.31; 123/90.16; 290/40 C

(58) Field of Classification Search ............ 123/90.27, 123/90.31, 90.6, 90.16, 90.15, 90.17, 90.12, 123/90.11, 90.18; 464/1, 2, 160; 290/40 C, 290/40 R See application file for complete search history.

(56) References Cited

U.S. PATENT DOCUMENTS

| 5,327,859 A * | 7/1994 | Pierik et al. ............. 123/90.17 |
| 5,560,267 A * | 10/1996 | Todd et al. .................... 74/604 |
| 6,278,196 B1 * | 8/2001 | Ehrhart et al. ........... 290/40 C |

FOREIGN PATENT DOCUMENTS

WO        WO 9721560 A1 *    6/1997

\* cited by examiner

*Primary Examiner*—Ching Chang
(74) *Attorney, Agent, or Firm*—Lucas & Mercanti, LLP

(57) ABSTRACT

Traction mechanism drive for an internal combustion engine, having a crankshaft gear wheel, at least one gear wheel which is arranged on a driven shaft, a wrap-around means and an electric machine which can be actuated in order to reduce rotational non-uniformities, the electric machine (9, 10) having a rotor (12) which is arranged on the or a camshaft (1, 11) and interacts with an immobile stator (15).

13 Claims, 2 Drawing Sheets

TRACTION MECHANISM DRIVE

FIELD OF THE INVENTION

The invention relates to a traction mechanism drive for an internal combustion engine, having a crankshaft gear wheel, at least one gear wheel which is driven on a driven shaft, a wrap-around means and an electric machine which can be actuated in order to reduce rotational non-uniformities.

BACKGROUND OF THE INVENTION

Traction mechanism drives of internal combustion engines conventionally have a crankshaft drive input gear wheel, at least one camshaft drive output, gear wheel and a chain or a toothed belt as a wrap-around means. They are subject, on account of torque fluctuations or angular speed changes, to oscillation excitations which lead to increased frictional forces and can adversely affect the service life and efficiency of the wrap-around means.

A system for active damping of vibrations is known from DE 44 23 577 A1, in which system an electric machine is used to reduce rotational non-uniformities. The electric machine comprises a flywheel which can be attached to the crankshaft of an internal combustion engine and has a stator, which interacts with said flywheel, as a fixed machine part which has excitation coils, so that the shaft can be braked or accelerated. In this way, influence can be exerted on the rotation of the shaft in a targeted manner in order to reduce non-uniformities such as speed fluctuations.

It is proposed in DE 40 15 701 A1 to influence rotational speed fluctuations, which occur during operation of a reciprocating piston internal combustion engine, by means of an electric machine which is connected to an energy source, for example the vehicle battery.

Said concepts have, however, not yet found their way into series production since extremely high electric currents of up to 200 A flow when damping rotational non-uniformities, so that an expensive cooling system is required.

With regard to optimizing their efficiency, traction mechanism drives and specifically camshaft drives of internal combustion engines are increasingly designed in a friction-reduced fashion, for example by using roller cam followers. This results, however, in the resetting torques of the camshafts increasing disproportionately, resulting in pronounced rotational non-uniformities of the shafts. The driven camshafts therefore disadvantageously influence the dynamic behavior of the traction mechanism drive. Engine elements which are connected to the camshaft, such as gasoline pumps, vacuum pumps, control drives etc., are afflicted by said increased dynamic loading, so that high expense is required in order that said components reach the demanded service life.

SUMMARY OF THE INVENTION

The invention is therefore based on the problem of specifying a traction mechanism drive for an internal combustion engine, in which in particular rotational non-uniformities in the region of the camshaft can be reduced.

According to the invention, to solve said problem, it is provided, in a traction mechanism drive of the type mentioned in the introduction, that the electric machine has a rotor which is arranged on a camshaft and said rotor interacts with an immobile stator.

In contrast to the crankshaft starter generators proposed in the prior art, the electric machine is situated directly on the camshaft. The torques to be dampened which occur there are significantly smaller than at the crankshaft. Accordingly, the current strengths which occur are significantly smaller, so that expensive cooling systems can be dispensed with. The electric machine can be operated either as a motor or as a generator and comprises the stator as an immobile basic element and the rotor, which is arranged on and can rotate with the camshaft, as a moveable basic element.

The electric machine can expediently be controlled in such a way that the rotor experiences a driving torque at a rotational speed which is too low and a braking torque at a rotational speed which is too high. As a result of the targeted control of the torque which acts on the rotor, rotational non-uniformities other than rotational speed fluctuations can also be compensated for. These can include deviations in the angular speed of a camshaft gear wheel; oscillations which occur in the wrap-around means or in a gear wheel can likewise be reduced.

In a further embodiment of the invention, it can be provided that the traction mechanism drive has a detection means for the rotational non-uniformities, actuating variables for controlling the rotor are derived from said detection means, in order to influence the dynamic behavior of the traction mechanism drive by means of the rotor. By including a detection means, it is possible to control the rotor in an open-loop or closed-loop fashion in order to reduce rotational non-uniformities which are present in a targeted fashion until they are lower than a predefined threshold value.

The traction mechanism drive according to the invention can be designed in such a way that the electric machine is arranged laterally at one end of the camshaft. With such a design, it is possible if appropriate to use a conventional camshaft to which is fastened the electric machine or its rotor. In other embodiments, the electric machine or its rotor can be arranged on or in a camshaft adjuster. Such an embodiment is particularly space saving.

Alternatively, the rotor of the electric machine in the traction mechanism drive according to the invention can be arranged on the camshaft between two cams. This results in a large number of possibilities for accommodating the electric machine, so that an optimum position for the electric machine can be selected depending on the available installation space.

Variants of the traction mechanism drive according to the invention are also possible in which two camshafts having in each case one rotor and an electric machine are provided.

BRIEF DESCRIPTION OF THE DRAWINGS

Further advantages and details of the invention are explained on the basis of the following description with reference to the figures, which are schematic drawings and in which.

DETAILED DESCRIPTION OF THE DRAWINGS

Figure 1:
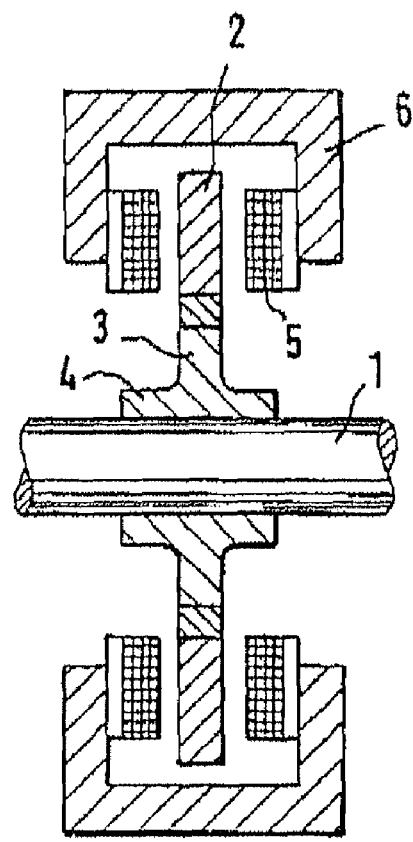
FIG. 1 shows a sectioned view of an electric machine, which is arranged on a camshaft, of the traction mechanism drive according to the invention.

FIG. 1 schematically shows the significant parts of an electric machine, which is arranged on a camshaft, of a traction mechanism drive.

A flywheel is arranged on a camshaft 1, said flywheel comprising an outer ring 2 and an inner ring 3 which are separate from one another. The inner ring 3 merges into a hub 4 which is fixedly connected to the camshaft 1. The flywheel forms the rotor of a linear motor.

The outer ring 2 is surrounded at both sides by stator coils 5 which are arranged on a bracket 6 which surrounds the outer ring 2 in the manner of a yoke. Said bracket 6 forms the immobile basic element of the electric machine, the stator. The bracket 6 is held, at a point which is not shown in FIG. 1, so that it does not move with the camshaft 1 as the latter rotates.

The electric machine operates in a known manner, as is described, for example, in DE 44 23 577 A1. Electric machines utilize the principle of electromagnetic induction or the Lorentz force. One stationary basic element (stator) and one moveable basic element (rotor or armature) are separated from one another by a gap but are linked to one another by means of a common magnetic flux which passes through the gap. Here, at least one basic element generates the magnetic primary field, usually with the aid of an excitation coil. The other basic field is equipped with one or more electric conductors. The primary field of one basic element penetrates the other basic element via the gap and effects a driving force, the Lorentz force, by means of combination with the electromagnetic field induced there. For the mode of operation of the electric machine, it is fundamentally unimportant whether the excitation coils are arranged on the stationary or on the moving basic element. The electric machine illustrated in FIG. 1 can therefore be operated both as a motor and as a generator.

Figure 2:
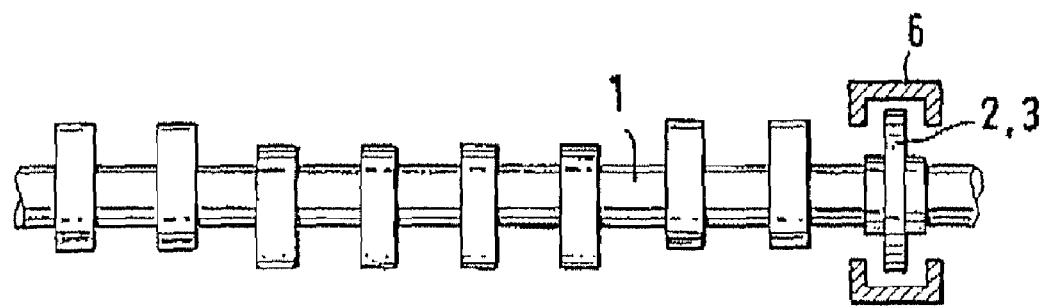
FIG. 2 shows an electric machine which is laterally attached to a camshaft.

FIG. 2 shows an electric machine which is arranged laterally on a camshaft. As can be seen in FIG. 2, the inner and outer rings 2, 3 are arranged in the end region of the camshaft 1. The rotational speed of the camshaft 1 is detected by means of a sensor and is supplied to a control unit. Rotational speed non-uniformities can be detected on the basis of the rotational speed signal; actuating variables for controlling the rotor are derived from said rotational speed non-uniformities. A decelerating or accelerating torque can be exerted on the camshaft 1 by changing the current supply to the stator coils. The rotational speed non-uniformities detected can be reduced or even eliminated through targeted control of the current supply. The same applies for detected oscillations which can be caused by the opening and closing of the valves or the dynamic behavior of the valve springs.

Figure 3:
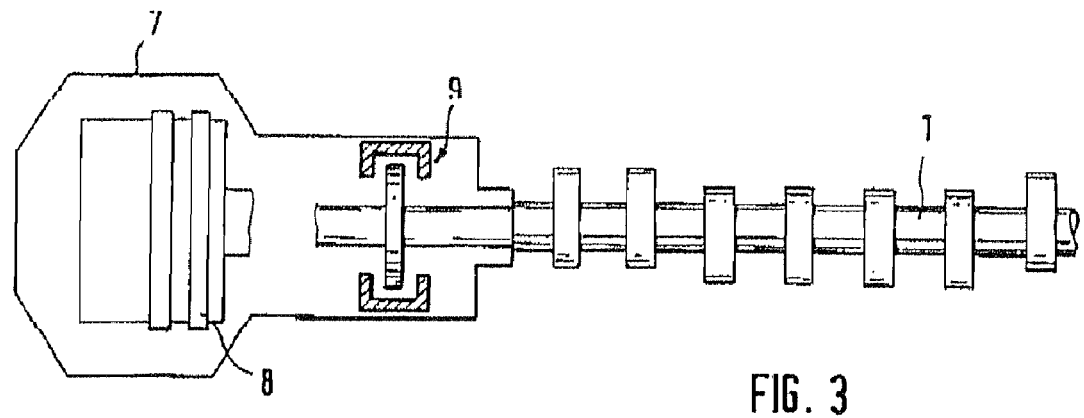
FIG. 3 shows an electric machine which is arranged on a camshaft adjuster.

FIG. 3 shows an electric machine which is arranged on a camshaft adjuster. In said embodiment, a hydraulic camshaft adjuster 7, which is illustrated schematically in FIG. 3, is provided laterally on the camshaft 1. The camshaft adjuster 7 makes it possible to rotate the camshaft 1 relative to a crankshaft in order to influence the control times for opening and closing the valves. In the interior of the camshaft adjuster 7 is situated a sprocket 8, as part of the traction mechanism drive, which is connected to a crankshaft gear wheel by means of a chain. The operation of the electric machine 9, which consists of a rotor and a stator, corresponds to that of FIG. 2.

Figure 4:
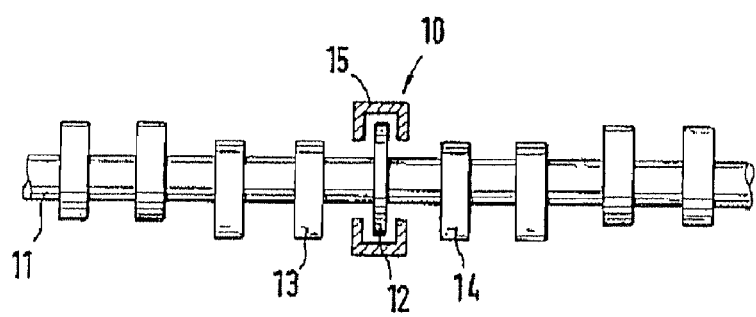
FIG. 4 shows an electric machine which is arranged between two cams.

FIG. 4 shows an electric machine which is arranged between two cams. The electric machine 10 is designed as in the preceding exemplary embodiments. The rotor 12, which is surrounded by the stator 15, is arranged on the camshaft 11 between two adjacent cams 13, 14. In said embodiment, no changes whatsoever are required in the region of the camshaft drive.

LIST OF REFERENCE SYMBOLS

1 Camshaft
2 Outer ring
3 Inner ring
4 Hub
5 Stator coils
6 Bracket
7 Camshaft adjuster
8 Sprocket
9 Electric machine
10 Electric machine
11 Camshaft
12 Rotor
13 Cam
14 Cam
15 Stator

The invention claimed is:

1. A traction mechanism drive for an internal combustion engine, comprising:
    a crankshaft gear wheel;
    at least one gear wheel which is arranged on a camshaft 1;
    a wrap-around means connecting the crankshaft gear wheel to the at least one gear wheel on the camshaft; and
    an electric machine, arranged on the camshaft, which is actuated in order to reduce rotational non-uniformities,
    wherein the electric machine has a flywheel rotor fixed to and extending radially outward from the camshaft and an immobile stator axially opposing and interacting with the flywheel rotor, the immobile stator positioned radially apart from the camshaft, and
    wherein the electric machine is operable as a motor or generator, depending on the type of rotational non-uniformities.

2. The traction drive according to claim 1, wherein the electric machine controls in such a way that the flywheel rotor experiences a driving torque at a rotational speed which is too low and a braking torque at a rotational speed which is too high.

3. The traction mechanism drive of claim 1, wherein the electric machine is arranged laterally at one end of the camshaft.

4. The traction mechanism drive of claim 1, wherein the electric machine is arranged on or in a camshaft adjuster.

5. The traction mechanism drive of claim 1, wherein the flywheel rotor of the electric machine is arranged on the camshaft between two earns.

6. The traction mechanism drive of claim 1, further comprising two camshafts each having the electric machine.

7. The traction mechanism drive of claim 1, further comprising:
    a detection means for the rotational non-uniformities and actuating variables for controlling the flywheel rotor are derived from said detection means and the dynamic behavior of the traction mechanism drive, can be influenced by means of the rotor.

8. The traction drive according to claim 7, wherein the electric machine controls in such a way that the flywheel rotor experiences a driving torque at a rotational speed which is too low and a breaking torque at a rotational speed which is too high.

9. The traction mechanism drive of claim 7, wherein the electric machine is arranged laterally at one end of the camshaft.

10. The traction mechanism drive of claim 7, wherein the electric machine is arranged on or in a camshaft adjuster.

11. The traction mechanism drive of claim 7, wherein the rotor of the electric machine is arranged on the camshaft between two cams.

12. The traction mechanism drive of claim 7, further comprising two camshafts each having the electric machine.

13. The traction mechanism drive of claim 1, wherein the flywheel rotor comprises a hub fixed to the camshaft, an inner ring extending radially outward from the hub, and an outer ring extending radially outward from the inner ring, and the immobile stator has coils which are positioned axially apart and axially opposing the outer ring.

* * * * *